Feb. 28, 1961 M. M. RANDALL 2,972,835
MINIATURE ANIMAL FORMS
Filed Nov. 12, 1958 2 Sheets-Sheet 2

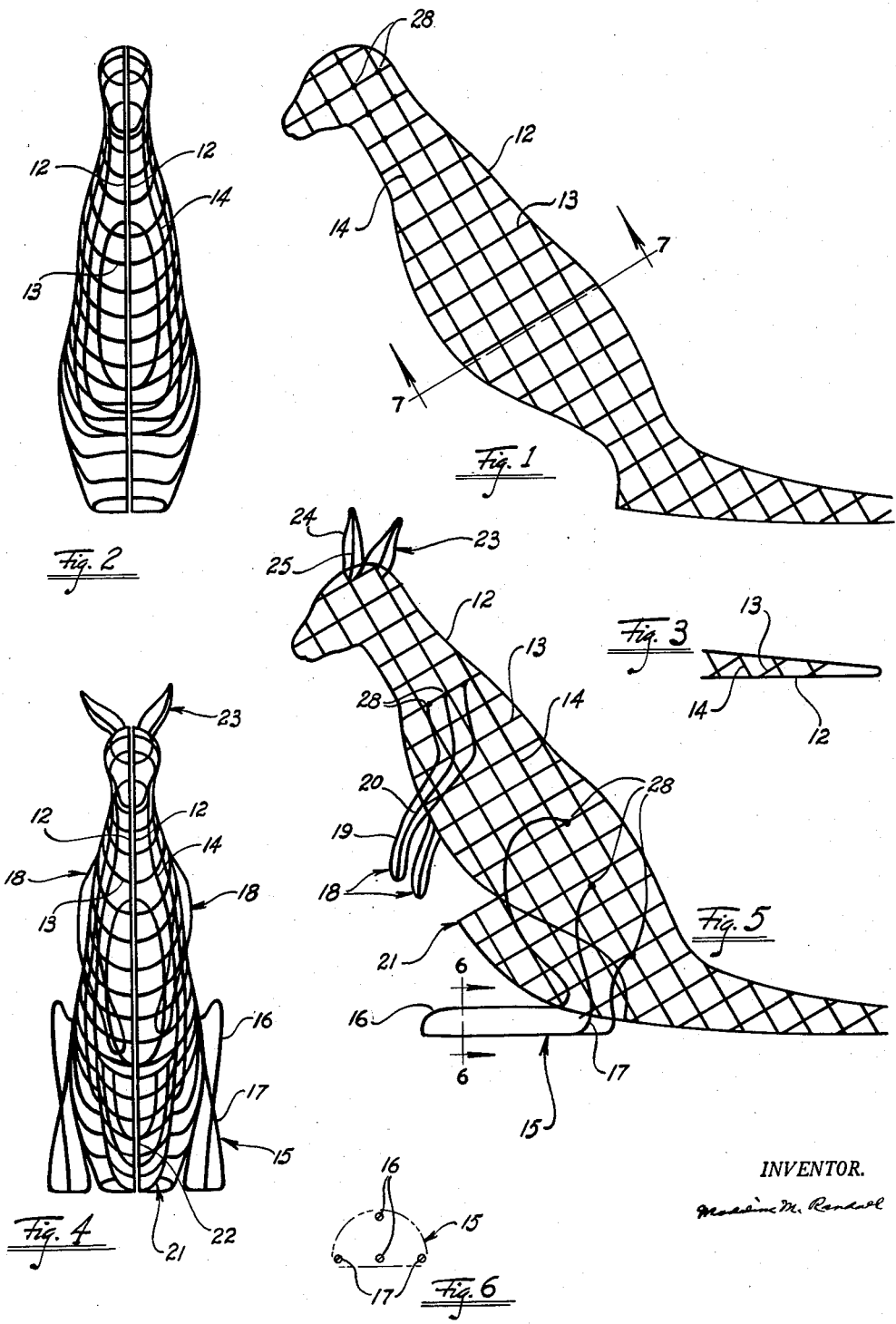

INVENTOR.
Madeline M. Randall

United States Patent Office 2,972,835
Patented Feb. 28, 1961

2,972,835
MINIATURE ANIMAL FORMS
Madeline Mary Randall, 4212 Altadena Ave., San Diego, Calif.
Filed Nov. 12, 1958, Ser. No. 773,523
2 Claims. (Cl. 46—162)

This invention relates in general to new and useful improvements in toy animals, and more particularly to a novel miniature animal form construction.

The primary object of this invention is to provide a novel animal form construction over which a covering may be readily applied, the animal form being hollow and formed of a series of wires disposed in crossing relation.

Another object of the invention is to provide a novel hollow animal form constructed of wires, each animal form being constructed in two halves, and each form half including a continuous wire having an outline corresponding to the side elevation of the animal form and two series of wires terminably secured to the continuous wire with the wires of one of the series crossing the wires of the other of the series, and the continuous wires of the two form halves being secured together.

A further object of the invention is to provide novel hollow miniature animal forms each of which is constructed of a plurality of wires secured together, the animal forms being readily adapted for use as parts of construction kits and being subject to modification by the addition of ears, legs, tails, etc. and being readily covered with paper mache and other readily applied covering materials.

With the above, and other objects in view that will hereinafter appear, the nature of the invention will be more clearly understood by reference to the following detailed description, the appended claims and the several views illustrated in the accompanying drawings:

In the drawings:

Figure 1 is a side elevational view of a typical basic animal form in accordance with the invention with the tail thereof being broken off.

Figure 2 is a front view of the animal form of Figure 1 with the two halves of the form slightly separated.

Figure 3 is a side elevational view of the broken off portion of the tail of the animal form of Figure 1.

Figure 4 is a front view similar to Figure 2 with legs, ears and pouch secured to the basic animal form.

Figure 5 is a side elevational view similar to Figure 1 showing the basic animal form modified as in Figure 4.

Figure 6 is an enlarged fragmentary sectional view taken along the section line 6—6 of Figure 5 and shows the details of a rear foot construction.

Figure 7:
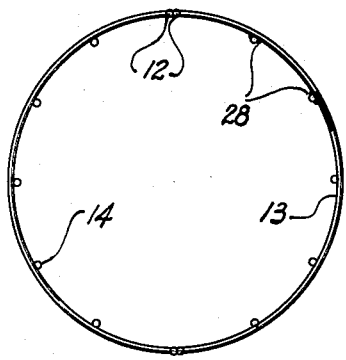
Figure 7 is an enlarged fragmentary sectional view taken along the section line 7—7 of Figure 1 and shows a typical section through the basic form.
Figure 8:
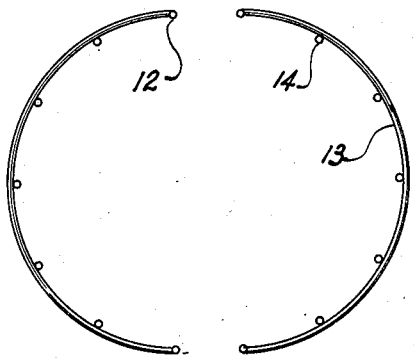
Figure 8 is a sectional view similar to Figure 7 wherein the two form halves are spaced apart.

Reference is now made to the drawings in detail wherein a basic animal form constructed in accordance with the invention is shown in Figures 1, 2 and 3. At this time it is pointed out that the illustrated basic animal form is for a kangaroo, but could have other shapes.

In accordance with the invention, it is proposed to construct the animal form in two halves of identical construction. Each form half includes a body outline frame 12 formed of a continuous wire. A first set of wires 13 extend generally longitudinally of the frame 12 in regularly spaced parallel relation. A second set of wires 14 extend generally transversely of the frame 12 and at right angles to the wires 13. Like the wires 13, the wires 14 are disposed in regularly spaced parallel relation. The wires 13 and 14 are welded together at the points of crossing thereof and at the intersections with the frame 12, the points of weld being referred to by the numeral 28. The wires 13 and 14 are curved or bowed to provide the proper three dimensional outline of the animal form.

As is best shown in Figures 4, 5 and 6, the basic animal form of Figures 1, 2 and 3 may be supplemented by the addition of the necessary external components. These will include hind legs and feet, generally referred to by the numeral 15. Each hind leg and foot is formed of a central reversely bent wire 16 disposed in a vertical plane and terminally welded to a respective basic form half as at 28. Each hind leg and foot is also formed of a reversely bent wire 17 disposed in a horizontal plane and having upstanding end portions welded to the respective basic form half as at 28.

Each of the basic form halves is also provided with a fore leg, generally referred to by the numeral 18. Each fore leg is formed of a reversely bent wire 19 lying generally in a vertical plane and defining front and back edges of the fore leg 18, and a reversely bent wire 20 lying generally in a plane at right angles to the plane of the wire 19 and forming the side edges of the fore leg 18. The wires are welded to each other and the respective basic form halves as at 28.

Each of the basic form halves is provided with an ear 23. Each ear 23 is formed of shaped wires 24, 25 welded to each other and to the head portion of the respective basic form half. A pouch, generally referred to by the numeral 26, is formed in halves and secured to the basic form halves. The pouch 26, like the basic form halves, is constructed of crossing longitudinal and transverse sets of parallel wires which are welded to the basic form halves.

The two halves of the basic animal form may be secured together and the extremities added, or the extremities may be secured to the basic form halves and then the halves may be secured together. When the form halves are secured together, this is accomplished by securing together the frames 12. The completed animal form may then be provided with any suitable covering to form the completed animal of Figure 9. The covering may be of any type including the very inexpensive papier mache which may be formed from paper strips applied in layers and secured together by paste. If desired, the form halves may be stuffed with paper to facilitate the covering thereof. On the other hand, the finished animal may be left hollow and could be used, for example, as a bank by providing a coin slot (not shown).

Figure 9:
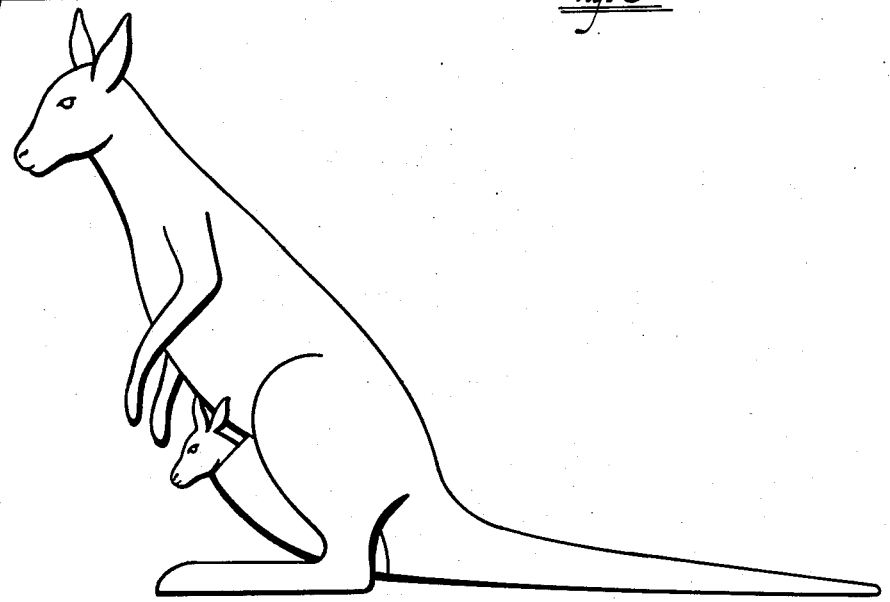
Figure 9 is an elevational view showing a completed kangaroo utilizing the animal form of Figure 5 and having a smaller kangaroo in the pouch thereof.
Figures 10, 11:
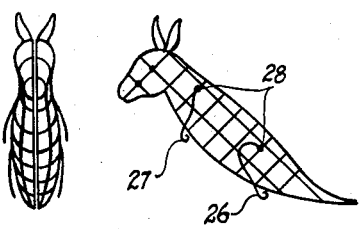
Figure 10 is an elevational view similar to Figure 5 and shows the form for the smaller kangaroo.
Figure 11 is a front view of the animal form of Figure 10 with the halves thereof spaced apart.

In Figure 9 a baby kangaroo is shown in the pouch 21 of the large kangaroo. The baby kangaroo is formed in the same manner as the large kangaroo by construction of a wire form, such as that of Figure 1, on a small scale. The small form is then provided with wires bent to define hind legs 26 and fore legs 27 which are welded to the halves of the form, as at 28, the small form being shown in Figures 10 and 11. The small form may also be provided with ears and other extremities, after which a suitable covering is applied.

From the foregoing, it will be seen that a novel miniature animal form has been devised. However, attention is directed to the fact that variations may be made in the example animal form construction disclosed herein without departing from the spirit and scope of the invention, as defined in the appended claims.

I claim:

1. A miniature animal form comprising a pair of separate, longitudinally symmetrical, skeletonized frame portions, and means securing said frame portions in juxtaposed relation in a common plane providing a substantially complete form profile for receiving a covering, said frame portions providing a base component upon which an animal form may be produced, said frame portions each comprising a plurality of spaced intersecting wire elements terminating at a common margin, said common margin comprising the plane about which said animal form is symmetrical, said wire elements comprising two different groups, one of said groups being at right angles to those of the other group, said first mentioned group being arcuate and having opposite ends terminating at said common margin, said common margin comprising a continuous wire element having the basic side elevational outline of said animal form.

2. The structure of claim 1 in which said frame portions include means forming a skeletonized pouch, and a second miniature skeletonized animal form similar in construction to the first mentioned form and removably receivable in said pouch.

References Cited in the file of this patent

UNITED STATES PATENTS

| | | |
|---|---|---|
| 2,496,951 | Menzin | Feb. 7, 1950 |
| 2,706,357 | Nigh et al. | Apr. 19, 1955 |
| 2,803,903 | Barry | Aug. 27, 1957 |
| 2,812,616 | Ford | Nov. 12, 1957 |
| 2,871,014 | Benson | Jan. 27, 1959 |